US012788685B2

United States Patent

(12) United States Patent
Böhringer et al.

(10) Patent No.: US 12,788,685 B2
(45) Date of Patent: Nov. 10, 2026

(54) APPARATUS FOR SEALING AND DRYING CAPSULES, AND A METHOD FOR DISMANTLING CAPSULE CARRIERS

(71) Applicant: Syntegon Technology GmbH, Waiblingen (DE)

(72) Inventors: Walter Böhringer, Remshalden (DE); Wolfgang Wick, Fichtenberg (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 19/108,503

(22) PCT Filed: Oct. 16, 2023

(86) PCT No.: PCT/EP2023/078630
§ 371 (c)(1),
(2) Date: Mar. 4, 2025

(87) PCT Pub. No.: WO2024/083719
PCT Pub. Date: Apr. 25, 2024

(65) Prior Publication Data

US 2026/0076875 A1 Mar. 19, 2026

(30) Foreign Application Priority Data

Oct. 21, 2022 (DE) ..................... 10 2022 127 954.5

(51) Int. Cl.
*A61J 3/07* (2006.01)

(52) U.S. Cl.
CPC .................................... *A61J 3/072* (2013.01)

(58) Field of Classification Search
CPC .... A61J 3/072; A61J 3/007; A61J 3/07; A61J 3/071; A61J 3/074; Y10S 53/90
See application file for complete search history.

(56) References Cited

U.S. PATENT DOCUMENTS 2,650,695 A * 9/1953 Robins .................. B65G 23/19 198/833
2,785,786 A * 3/1957 Bartlett .................. A61J 3/007 198/398

(Continued)

FOREIGN PATENT DOCUMENTS

| | | | |
|---|---|---|---|
| CN | 107982066 A | | 5/2018 |
| CN | 208525438 U | * | 2/2019 |
| CN | 212466580 U | | 2/2021 |

OTHER PUBLICATIONS

International Search Report and Written Opinion for Application No. PCT/EP2023/078630 dated Dec. 15, 2023 (14 pages including English machine translation).

(Continued)

*Primary Examiner* — Shelley M Self
*Assistant Examiner* — David G Shutty
(74) *Attorney, Agent, or Firm* — Michael Best & Friedrich LLP

(57) ABSTRACT

The invention relates to an apparatus (10) for sealing and drying capsules (12), comprising a sealing device (14) for sealing capsules (12) and a drying device (16) for drying capsules (12), the drying device (16) comprising a plurality of capsule carriers (18), a first chain (26) and a second chain (28) for receiving and transporting the capsule carriers (18), each capsule carrier (18) being coupled or couplable to the first chain (26) and to the second chain (28) by means of a snap-fit connection (30). The invention also relates to a method for dismantling capsule carriers (18) in such an apparatus (10).

18 Claims, 10 Drawing Sheets

(56) References Cited

U.S. PATENT DOCUMENTS

| | | | | | |
|---|---|---|---|---|---|
| 3,200,556 | A * | 8/1965 | Ackley | A61J 3/072 53/329.2 |
| 4,172,035 | A * | 10/1979 | Adams | B01D 33/056 210/232 |
| 4,584,817 | A * | 4/1986 | Yamamoto | A61J 3/072 53/329.2 |
| 4,609,417 | A * | 9/1986 | Smith | B29C 65/1487 53/329.2 |
| 4,761,932 | A * | 8/1988 | Harvey | A61J 3/072 53/329.2 |
| 4,793,119 | A * | 12/1988 | Maso | A61J 3/072 53/329.2 |
| 4,802,323 | A * | 2/1989 | Garris | A61J 3/072 53/53 |
| 4,922,682 | A * | 5/1990 | Tait | A61J 3/072 53/329.3 |
| 5,054,258 | A * | 10/1991 | Tait | A61J 3/072 198/803.14 |
| 5,143,500 | A * | 9/1992 | Schuring | F16B 19/1027 411/339 |
| 6,126,356 | A * | 10/2000 | Russell | G03G 15/0935 403/252 |
| 2015/0150198 | A1* | 6/2015 | Sinha | A01G 27/00 29/891 |
| 2018/0266169 | A1* | 9/2018 | Wray | E05F 15/70 |

OTHER PUBLICATIONS

German Patent Office Action for Application No. 102022127954.5 dated Sep. 4, 2023 (11 pages including English machine translation).

* cited by examiner

APPARATUS FOR SEALING AND DRYING CAPSULES, AND A METHOD FOR DISMANTLING CAPSULE CARRIERS

BACKGROUND

The invention relates to an apparatus for sealing and drying capsules and to a method for dismantling capsule carriers in such an apparatus.

Capsules made from gelatin or those made from plant-based substitutes usually consist of two halves that are put together. In an upstream process, the capsules are usually filled with medical bulk materials, such as powder or pellets, with liquid substances for medical use, or with nutritional supplements. To do this, the capsules, which are usually delivered sealed and put together, are opened, filled, and simply put back together again.

The sealing of the assembled capsules takes place in a next step, in a sealing machine. Here, the capsules are sealed at the seam between the two capsule halves, usually by adding an active substance to the seam or by permanently welding them to protect the product.

CN 107982066 A discloses such a sealing machine.

Inside the sealing machine, the capsules are received in capsule carriers. The capsules are transported by means of the capsule carriers. After the capsules have been sealed, the capsule carriers with the capsules received therein are transported into a drying device. The still wet or moist sealing seam of the capsules can dry in the drying device. The capsule carriers are usually transported using two chains. The capsule carriers can be suspended between the two chains and secured from falling out by only their own weight.

After sealing a batch of capsules (at the end of a batch), the entire sealing machine usually needs to be cleaned. For this purpose, all capsule carriers are dismantled, transported to a cleaning apparatus and cleaned. The cleaned capsule carriers must then be reinserted into the sealing machine.

Here it is disadvantageous that mounting or dismantling the capsule carriers is often time-consuming and/or complicated.

It is therefore an object of the present invention to provide an apparatus for sealing and drying capsules and a method for dismantling capsule carriers in such an apparatus, wherein the above disadvantages are eliminated.

SUMMARY

This object is achieved by an apparatus for sealing and drying capsules according to the disclosure.

The capsules can be hard capsules made of gelatin or of substances of plant origin (or other origin).

The apparatus comprises a sealing device for sealing capsules and a drying device for drying capsules.

The drying device comprises a plurality of capsule carriers. Each capsule carrier is elongated and has a first end, a second end, and a plurality of receptacles for receiving capsules. The receptacles can be arranged along the longitudinal extension of the individual capsule carriers, in particular along a straight line. Each receptacle can be configured to receive a capsule.

The drying device comprises a first chain and a second chain for receiving and transporting the capsule carriers. The capsule carriers can be transported within the drying device using the two chains.

The first end of each capsule carrier is coupled or couplable (i.e. connected or connectable) to the first chain by means of a snap-fit connection (clip connection).

The second end of each capsule carrier is coupled or couplable (connected or connectable) to the second chain by means of a snap-fit connection (clip connection).

The snap-fit connections are designed in such a way that the capsule carriers can be rotated about an axis of rotation when the snap-fit connections are closed. The capsule carriers can be mounted so as to rotate about the corresponding axis of rotation when they are coupled (connected) to the two chains.

The snap-fit connections can in particular be designed such that they can encompass an extension on the chains in a form-fitting manner. The encompassing need not be completely enclosing. The encompassing ensures in a form-fitting manner that a simple fall does not separate the snap-fit connections and the extension. The form-fitting encompassing can in particular be clamp free. The snap-fit connection thus encloses the extension without gripping it in a force-fitting or clamping manner. In particular, the snap-fit connections can be designed to be clamp like with expandable clamping arms. The snap-fit connections can be pressed on to an extension on the chains so that the arms expand and snap back and encompass the extension in a form-fitting manner. The inner surfaces of the clamp arms are designed to complement in particular the external form of the extensions on the chains.

The snap-fit connections can be designed as ball joint connections with a snap-fit ball and/or as ring snap-fit connections with a snap-fit cylinder.

The axis of rotation of a capsule carrier can run along the central longitudinal axis of the capsule carrier or can run parallel to it. The axis of rotation of a capsule carrier can run along the longitudinal extension of the capsule carrier.

The snap-fit connections allow for safe and easy mounting and dismantling of the capsule carriers. The capsule carriers can be mounted or dismantled without tools.

According to a further development, the first chain and the second chain can each have a plurality of extensions. The extensions can be made pin-shaped or bolt-shaped (as bolts). The extensions can each be arranged on a bolt connecting two adjacent chain links of the first chain and/or the second chain.

The first end and the second end of the capsule carriers can each have a clamp (or clip). One extension and one clamp can form a snap-fit connection.

This allows a snap-fit connection to be implemented using simple means.

According to a further development, each extension can have a stop. The stop can be designed in the form of a collar or flange around the extension, in particular around one end of an extension.

The stop can be designed such that when the snap-fit connection is closed, the stop engages behind the corresponding clamp of a capsule carrier, in particular in the axial direction. This allows the capsule carrier to be fixed with a form-fit between the first chain and the second chain, in particular in the axial direction.

This enables a form-fitting fixing of the capsule carriers in all spatial directions and in particular in the axial direction (see below).

According to a development, the drying device can have a plurality of gears. The gears can mesh with the links of the first chain and/or the second chain. The first and/or second chain can be pulled over the gears. The first and/or the second chain can be moved in a circuit by means of the gears. The first chain and/or the second chain can be arranged in a slalom manner in the drying device by means of the gears. The first chain, the second chain and the gears can be designed as a chain tower.

By using the gears, the path of the two chains can be realized flexibly within the drying device.

According to a further development, the apparatus can comprise a feeding device for feeding the capsules into the sealing device. In other words, the capsules can be fed to the sealing device by means of a feeding device.

This eliminates the need for an additional machine for feeding in the capsules.

According to a development, the drying device can comprise an ejection device. The ejection device can be designed to remove or eject capsules from the receptacles of the capsule carriers.

The ejection device can be designed to release the snap-fit connections between a capsule carrier, the first chain, and the second chain. In other words, the coupling or connection between the capsule carriers and the two chains can be released by means of the ejection device.

This allows the capsules to be removed automatically from the capsule carrier receptacles. In addition, the capsule carriers can be released from the two chains automatically.

According to a development, the ejection device can comprise a shaft. The shaft can have a first gear and a second gear. The two gears can each be arranged at one end of the shaft. The first gear and the second gear can be coupled to the shaft in a rotationally fixed manner, in particular arranged at or on the shaft. The first gear can mesh with the links of the first chain. The second gear can mesh with the links of the second chain.

The shaft can have a first bearing surface and a second bearing surface. The first bearing surface can be adjacent to the first gear. The second bearing surface can be adjacent to the second gear. Each capsule carrier can have a contact surface in a region of its first end and in a region of its second end.

Each capsule carrier can contact at least one region of the first bearing surface and at least one region of the second bearing surface with at least one region of its contact surfaces, in particular with all of its contact surfaces, when the capsule carrier is moved around the shaft. In other words, each capsule carrier can rest with its contact surfaces on the first or second bearing surface of the shaft, at least in some regions, when the capsule carrier is moved around the shaft.

The capsule carriers are then fixed with a form-fitting connection, in particular at each of their ends, by means of the contact surface and the snap-fit connection. The capsule carriers are then coupled to the shaft in an in particular rotationally fixed manner. Due to the resulting rotation of the capsule carriers about the shaft, the capsules can fall out of the capsule carrier receptacles due to gravity. In other words, the capsule carriers can be rotated in such a way that the capsules can fall out of the receptacles of the capsule carrier due to gravity.

This allows the capsules to be removed from the capsule carrier receptacles using simple means, in particular in an automated manner.

According to a further development, the shaft can comprise a sleeve, a first flange, and a second flange. The sleeve can be cylindrical, in particular circular-cylindrical. The sleeve can be designed as a hollow cylinder. The sleeve, the first flange, the second flange and/or the shaft can be arranged coaxially. The sleeve can enclose the shaft radially outwardly. The sleeve can be arranged between the first flange and the second flange.

The sleeve, the first flange and the second flange can be coupled together such that a rotation of the sleeve relative to the shaft causes an axial movement of the first flange and the second flange between a first position and a second position. In the first position, the first flange and the second flange can be at a minimum distance from each other. In the second position, the first flange and the second flange can be at a maximum distance from each other.

Rotating the sleeve relative to the shaft in a first direction of rotation can cause the first flange and the second flange to move axially toward each other. Rotating the sleeve relative to the shaft in a second direction of rotation opposite to the first direction of rotation can cause the first flange and the second flange to move axially away from each other.

The shaft can comprise a plurality of, in particular two, flexible elements. The flexible elements can be designed as O-rings.

The flexible elements, the first flange, and the second flange can be configured and arranged such that a movement of the first flange and the second flange to the first position causes a radial movement of the flexible elements radially inward. A movement of the first flange and the second flange to the first position can cause a reduction in the diameter of the flexible elements.

The flexible elements, the first flange, and the second flange can be configured and arranged such that a movement of the first and the second flange to the second position causes a radial movement of the flexible elements radially outward. A movement of the first flange and the second flange to the second position can cause an enlargement in the diameter of the flexible elements.

The shaft can be set up such that when the first flange and the second flange are arranged in the second position, the flexible elements move the capsule carriers radially outward when the capsule carriers are moved about the shaft. This allows the snap-fit connections to be released. The capsule carriers can be pushed out of the snap-fit connections by means of the flexible elements.

This allows the snap-fit connections to be released automatically and thus the capsule carriers to be released from the first and second chains.

The shaft can be rotated about an axis of rotation. The axis of rotation of the shaft can run along a central longitudinal axis of the shaft or can run parallel to it.

In the present case, "axially" or "axial direction" means a direction aligned along the central longitudinal axis or parallel to the central longitudinal axis of the shaft. In other words, the central longitudinal axis of the shaft is oriented in the axial direction. Accordingly, "radially" or "radial direction" means a direction aligned perpendicularly to the central longitudinal axis of the shaft and going out from the central longitudinal axis of the shaft.

According to a further development, the first flange can be coupled to the sleeve by means of a screw connection, in particular with a left-hand thread. The second flange can be coupled to the sleeve by means of a screw connection, in particular with a right-hand thread. This allows the coupling between the sleeve and the two flanges described above to be implemented using simple means. The first flange and the second flange can each be pneumatically, hydraulically, and/or electrically coupled to the sleeve.

According to a development, the ejection device can comprise a deflector. The deflector can be designed in such a way that the capsule carriers can be detached from the first chain and/or the second chain by means of the deflector. The releasing of the capsule carriers can take place by means of the deflector.

According to a further development, the ejection device can comprise at least one inflatable hollow ring, in particular a plurality of inflatable hollow rings. The ejection device can comprise at least one, in particular a plurality of, hub extension means. The hollow ring, in particular the hollow rings, and/or the hub extension means, in particular the plurality of hub extension means, can be designed such that they can increase the hub diameter of the shaft. The hollow ring(s) and/or the hub extension means (or plurality thereof) can be arranged on the shaft.

Other technical measures that can increase the hub diameter of the shaft are also conceivable.

According to a development, the ejection device can comprise a chute. The chute can be designed to guide the capsules removed from the receptacles of the capsule carriers out of the apparatus. The capsules that fall out of the capsule carrier receptacles due to gravity can land in the chute.

The chute can also be designed to guide the capsule carriers released from the first chain and the second chain out of the apparatus. The capsule carriers released from the two chains can fall into the chute due to gravity.

The chute can be arranged below the shaft in the direction of gravity.

This allows both the capsules and the capsule carriers to be removed from the apparatus using simple means.

The above object is further achieved by a method for dismantling (or detaching) capsule carriers of an apparatus according to the above embodiments.

The method comprises the steps of:

Providing the apparatus, wherein the capsule carriers are coupled to the first chain and the second chain by means of the snap-fit connections.

Exerting a (relative) force on the individual capsule carriers in order to release (or open) the snap-fit connection and to release the capsule carriers from the first chain and the second chain.

With regard to the advantages that can be achieved with the method, reference is made to the statements relating to the apparatus in this respect. The measures described in connection with the apparatus and/or explained below can serve for further embodiments of the method.

According to a development, the method can comprise the step of:

Moving the capsule carriers by means of the first chain and the second chain along a circular path or along a circular segment, in particular around a shaft.

Exerting a (relative) force directed radially outwards from a center of the circular path or the circular segment on the capsule carriers in order to open or release the snap-fit connections and to release the capsule carriers from the first chain and the second chain.

According to a development, the method can comprise the step of:

Fixing the capsule carriers in such a way that rotation about the axis of rotation of the capsule carriers due to gravity is prevented while the capsule carriers are moved along the circular path or along the circular segment, in particular around a shaft.

According to a development, the method can comprise the step of:

Leading or guiding the capsule carriers released from the first chain and the second chain out of the apparatus, in particular by means of a chute.

BRIEF DESCRIPTION OF THE DRAWINGS

Further features, details and advantages of the invention emerge from the wording of the claims and from the following description of an exemplary embodiment with reference to the drawings. In the drawings:

DETAILED DESCRIPTION

In the following description and in the figures, corresponding components and elements bear the same reference signs. For improved clarity, not all reference signs are reproduced in all figures.

Figure 1:
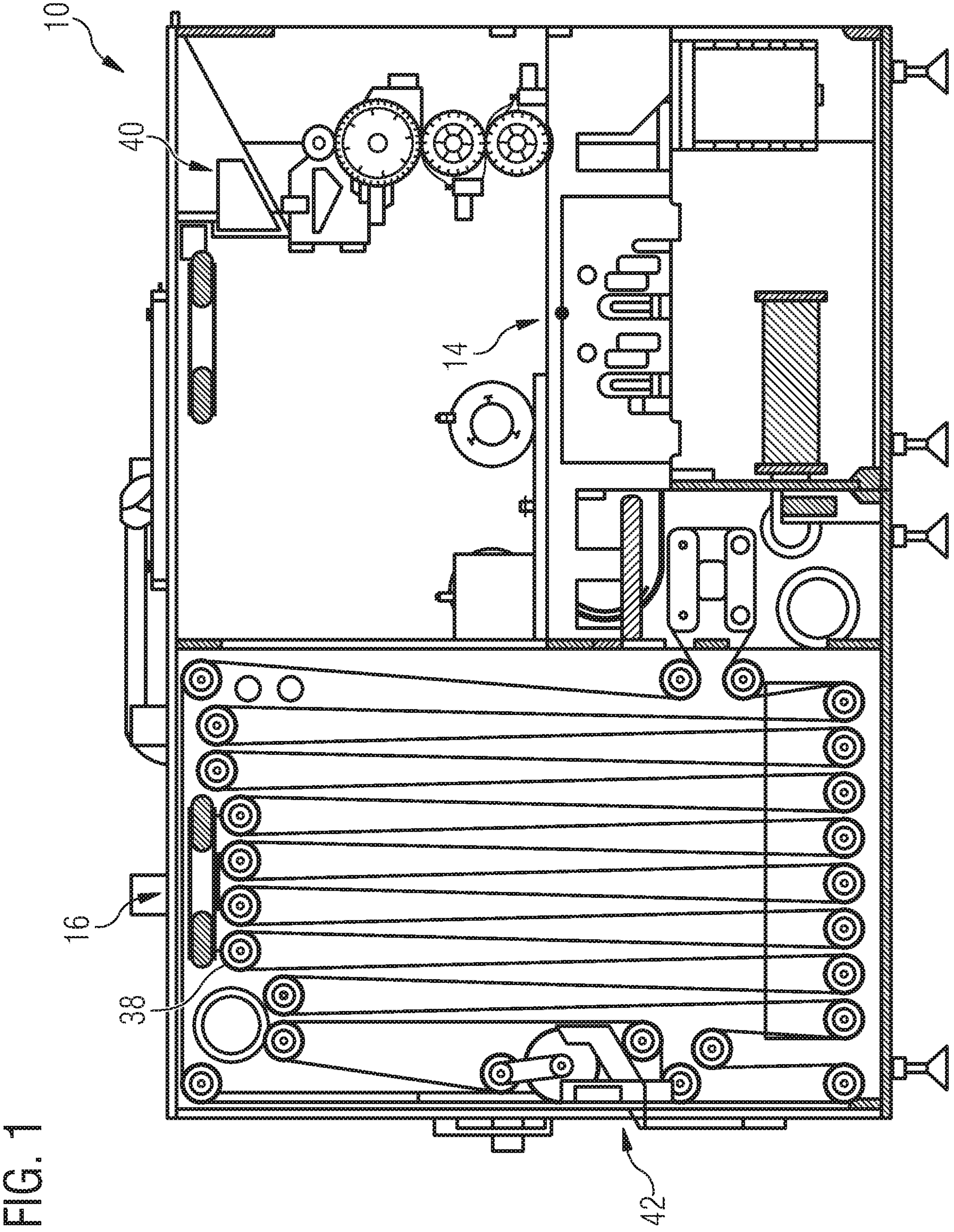
FIG. 1 is a front view of an apparatus for sealing and drying capsules.

FIG. 1 shows a front view of an apparatus 10 for sealing and drying capsules 12. The apparatus 10 comprises a sealing device 14 for sealing capsules 12 and a drying device 16 for drying the capsules 12. The apparatus 10 also comprises a feeding device 40 for feeding the capsules 12 into the sealing device 14.

In the sealing device 14, the already-filled and closed capsules 12 are sealed. After sealing the capsules 12, they are dried in the drying device 16.

The drying device 16 has a plurality of capsule carriers 18. The capsules 12 are received and transported in the drying device 16 by means of the capsule carriers 18.

Figure 2:
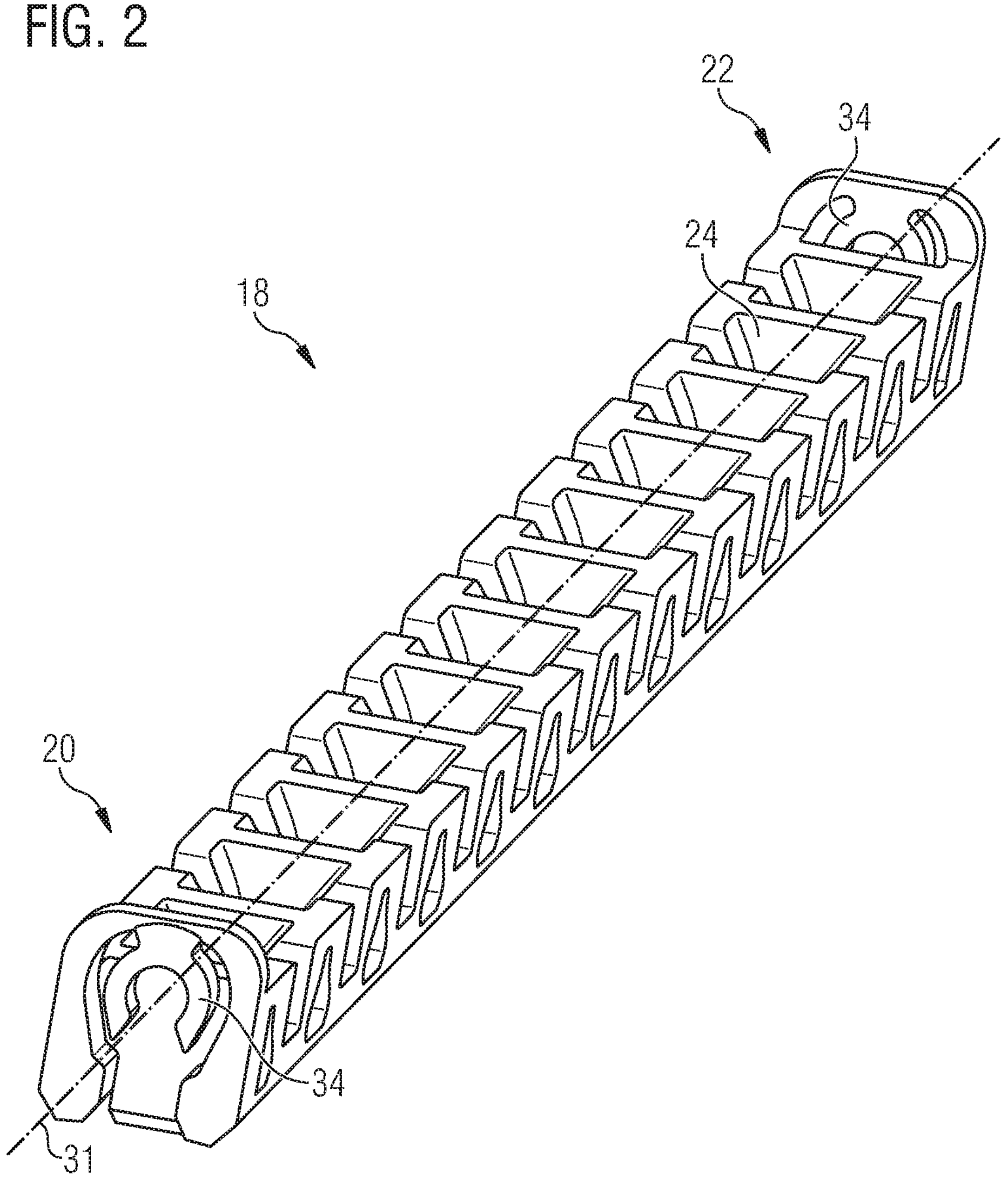
FIG. 2 is a perspective representation of a capsule carrier of the apparatus according to FIG. 1.

FIG. 2 is a perspective view of a capsule carrier 18 of the apparatus 10 according to FIG. 1. The capsule carriers 18 are each elongated and each have a first end 20 and a second end 22. The capsule carriers 18 each have a plurality of receptacles 24. The receptacles 24 are arranged next to one another or one behind the other along the longitudinal extension of the corresponding capsule carrier 18.

Figure 5:
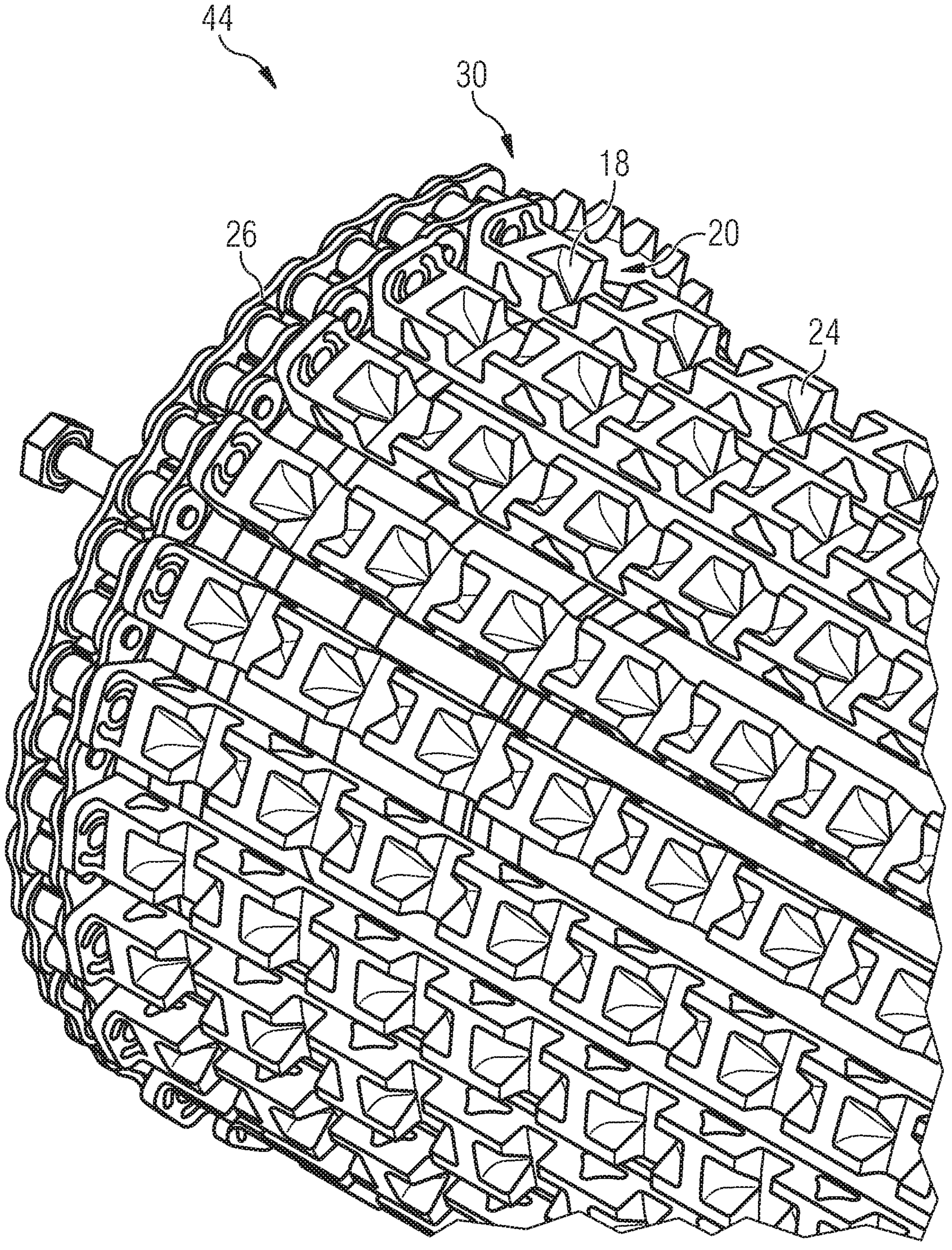
FIG. 5 shows a detail of a perspective view of a shaft of a drying device of the apparatus according to FIG. 1.
Figure 10:
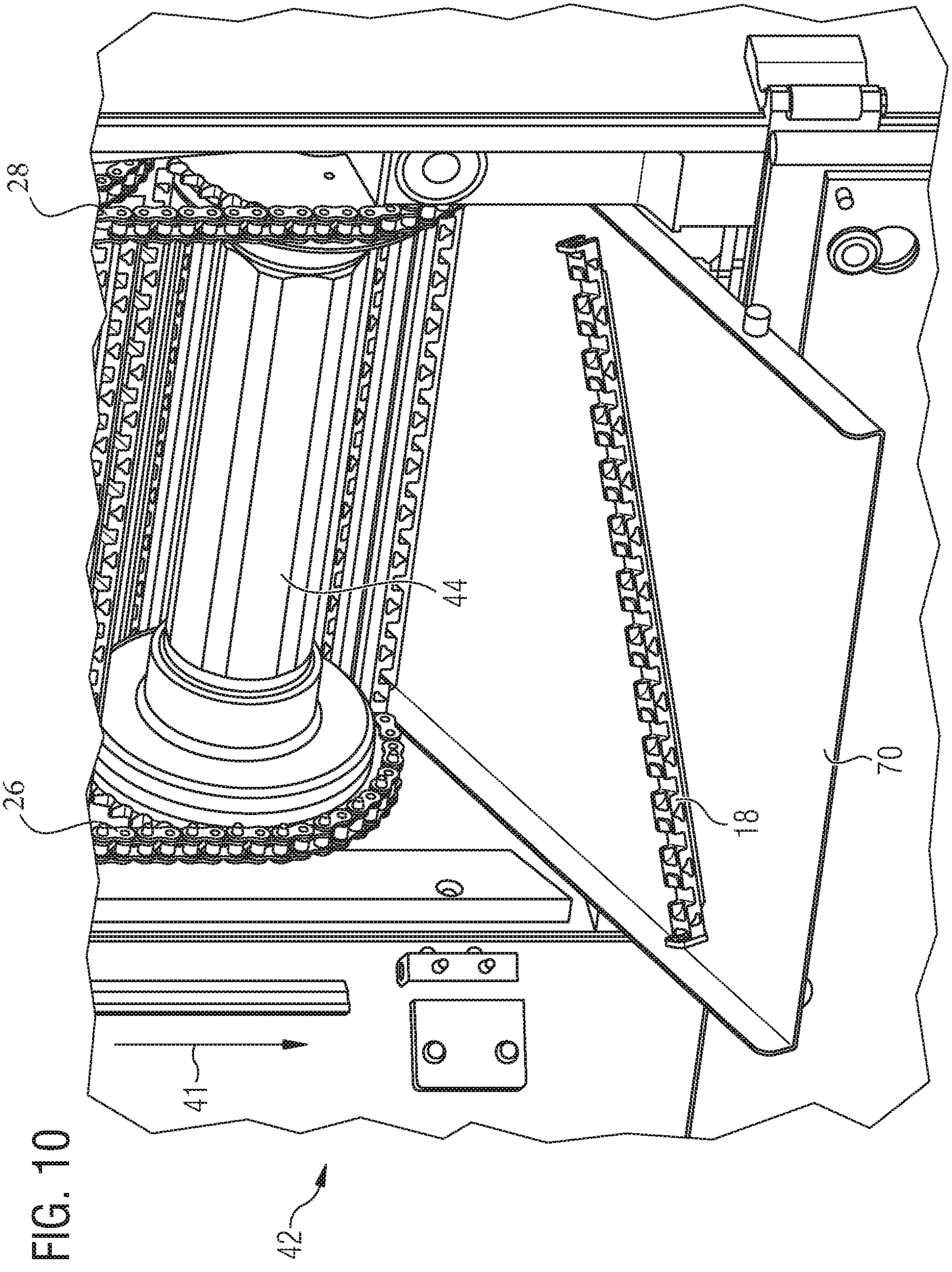
FIG. 10 is a perspective view of the shaft according to FIG. 5 and a chute.

The drying device 16 further comprises a first chain 26 and a second chain 28 for receiving and transporting the capsule carriers 18 (see e.g. FIGS. 1, 5, or 10). Each capsule carrier 18 is coupled or connected with its first end 20 to the first chain 26 and with its second end 22 to the second chain 28. For transporting the capsule carriers 18, the drying device 16 has a plurality of gears 38. The two chains 26, 28 are moved in slalom-like fashion in a circuit by means of a plurality of gears 38 in the drying device 16 (see FIG. 1).

The capsule carriers 18 are coupled or connected to the two chains 26, 28 by means of a snap-fit connection 30. For this purpose, each capsule carrier 18 has a clamp 34 at its first end 20 and its second end 22. The first chain 26 and the second chain 28 each have a plurality of bolt-shaped extensions 32 which correspond to the clamps 34 of the capsule carriers 18. In other words, the clamps 34 of the capsule carriers 18 and the extensions 32 of the two chains 26, 28 form in each case a snap-fit connection 30.

Figure 3:
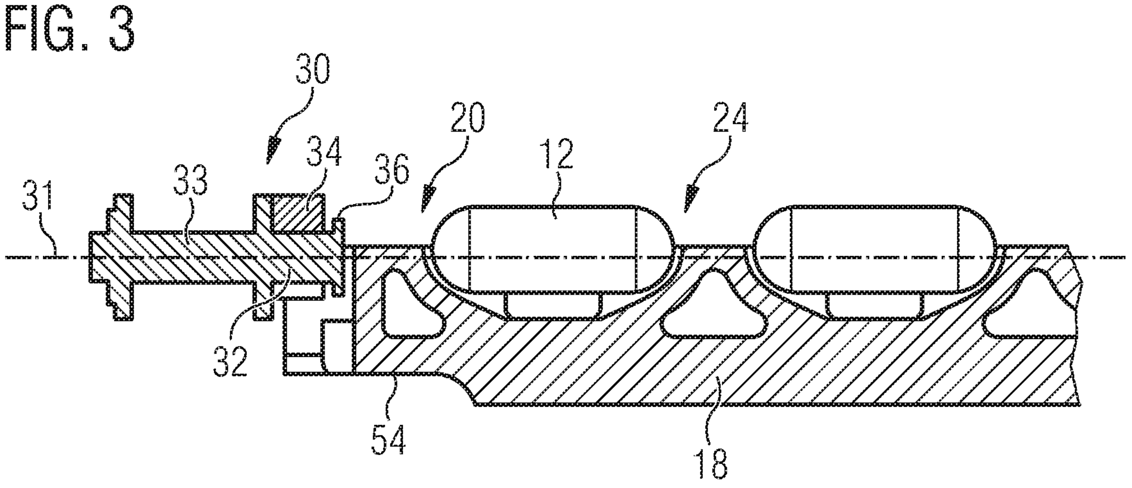
FIG. 3 shows a detail of a sectional view of the capsule carrier according to FIG. 2.

FIG. 3 shows a detail of a sectional view of the capsule carrier 18 according to FIG. 2. Two capsules 12 are shown received in the receptacles 24 of the capsule carrier 18 shown. The capsule carrier 18 shown is coupled or connected with its first end 20 or with the clamp 34 arranged at the first end 20 to the illustrated extension 32 of the first chain 26. The first chain 26 or its chain links are not shown in FIG. 3 for the sake of clarity.

In the present case, the extension 32 forms a prolongation of a bolt 33 which connects or couples two adjacent chain links of the first chain 26 with each other. The extension 32 and the bolt 33 are each made in one piece in the present case.

The capsule carriers 18 can each rotate about an axis of rotation 31 when they are connected or coupled to the two chains 26, 28 (i.e. when the snap-fit connections 30 are closed). The rotatable mounting of the capsule carriers 18 is formed by the snap-fit connections 30. The axes of rotation 31 of the capsule carriers 18 each extend parallel to the longitudinal extension of the corresponding capsule carrier 18 (see FIG. 2).

In the present case, the extension 32 has a stop 36 which is formed in the manner of a flange (or collar) around one end of the extension 32. The stop 36 prevents a releasing or opening of the snap-fit connection 30 by a movement of the extension 32 or the capsule carrier 18 along the axis of rotation 31 (in FIG. 3 to the left or right).

The drying device 16 furthermore has an ejection device 42.

Figure 4:
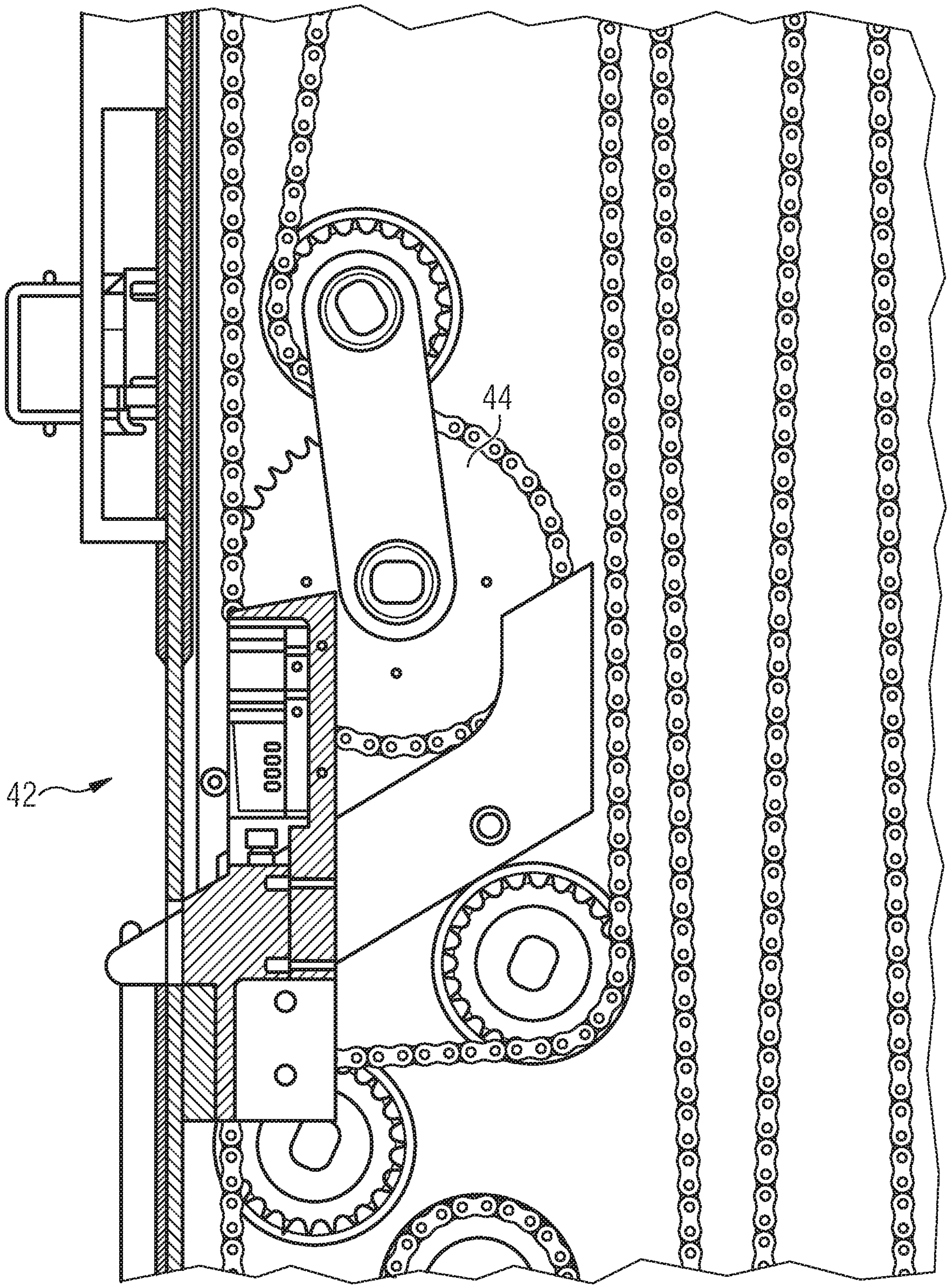
FIG. 4 shows an enlarged detail from FIG. 1.

FIG. 4 shows an enlarged detail from FIG. 1. The ejection device 42 is shown in FIG. 4. The ejection device 42 has a shaft 44. The shaft 44 has a first gear 46 and a second gear 48. The first gear 46 meshes with the first chain 26 (or with its chain links). The second gear 48 meshes with the second chain 28 (or with its chain links). Thus, the capsule carriers 18 coupled to the two chains 26, 28 are moved or transported around the shaft 44 (see FIG. 7).

FIG. 5 shows a detail of a perspective view of the shaft 44. FIG. 5 illustrates how the capsule carriers 18 are moved around the shaft 44. The capsule carriers 18 are rotated about the corresponding axis of rotation 31 in such a way that the capsules 12 can fall out of the receptacles 24 of the capsule carriers 18 due to gravity. The capsules 12 are not shown for the sake of clarity.

Figure 6:
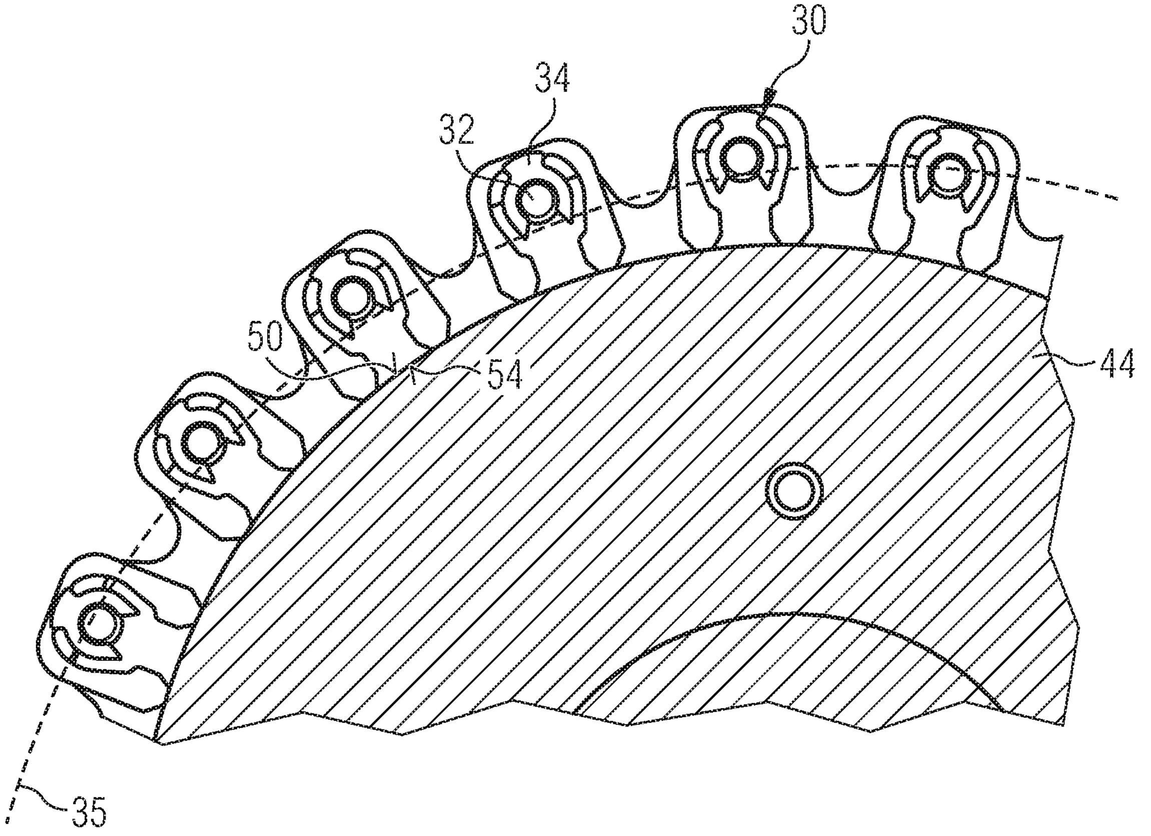
FIG. 6 shows a detail of a sectional view of the shaft according to FIG. 5.

FIG. 6 shows a detail of a sectional view of the shaft 44 according to FIG. 5. The shaft 44 is designed to be rotatable about an axis of rotation 37 (see FIG. 7). The capsule carriers 18 are moved along a circular path or a circular segment 35 about the shaft 44. The capsule carriers 18 are thus at least temporarily coupled to the shaft 44 in a rotationally fixed manner. This causes the capsule carriers 18 to move about the axis of rotation 37 (see FIG. 7) of the shaft 44.

The capsule carriers 18 are pressed onto the shaft 44 by means of the first chain 26 and the second chain 28 (or by means of the snap-fit connections 30 with the two chains 26, 28), whereby a (at least temporary) rotationally fixed coupling is established between the shaft 44 and the capsule carriers 18.

Figure 7:
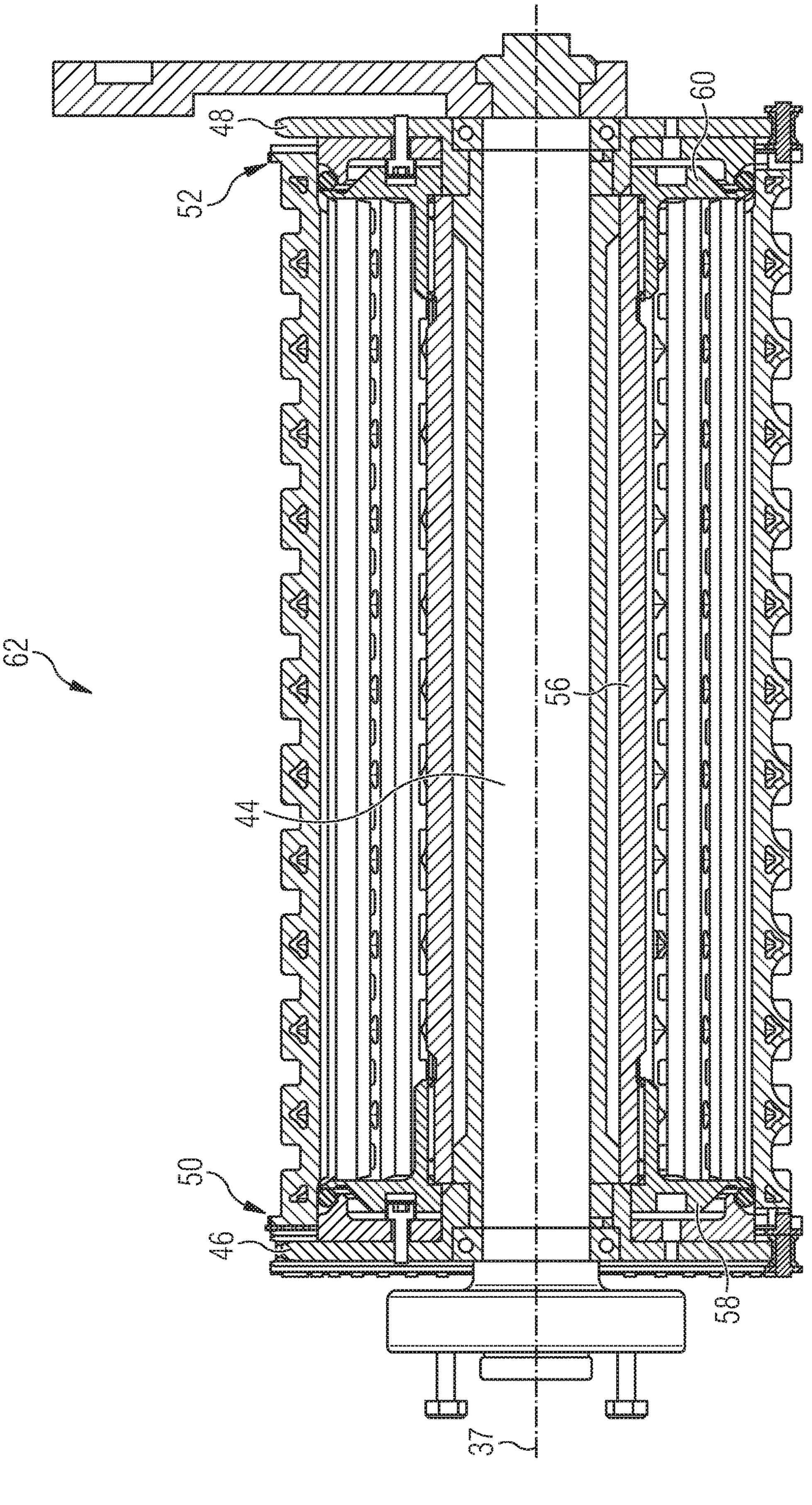
FIG. 7 is a sectional view of the shaft according to FIG. 5 with a first flange and a second flange in a first position.
Figure 8:
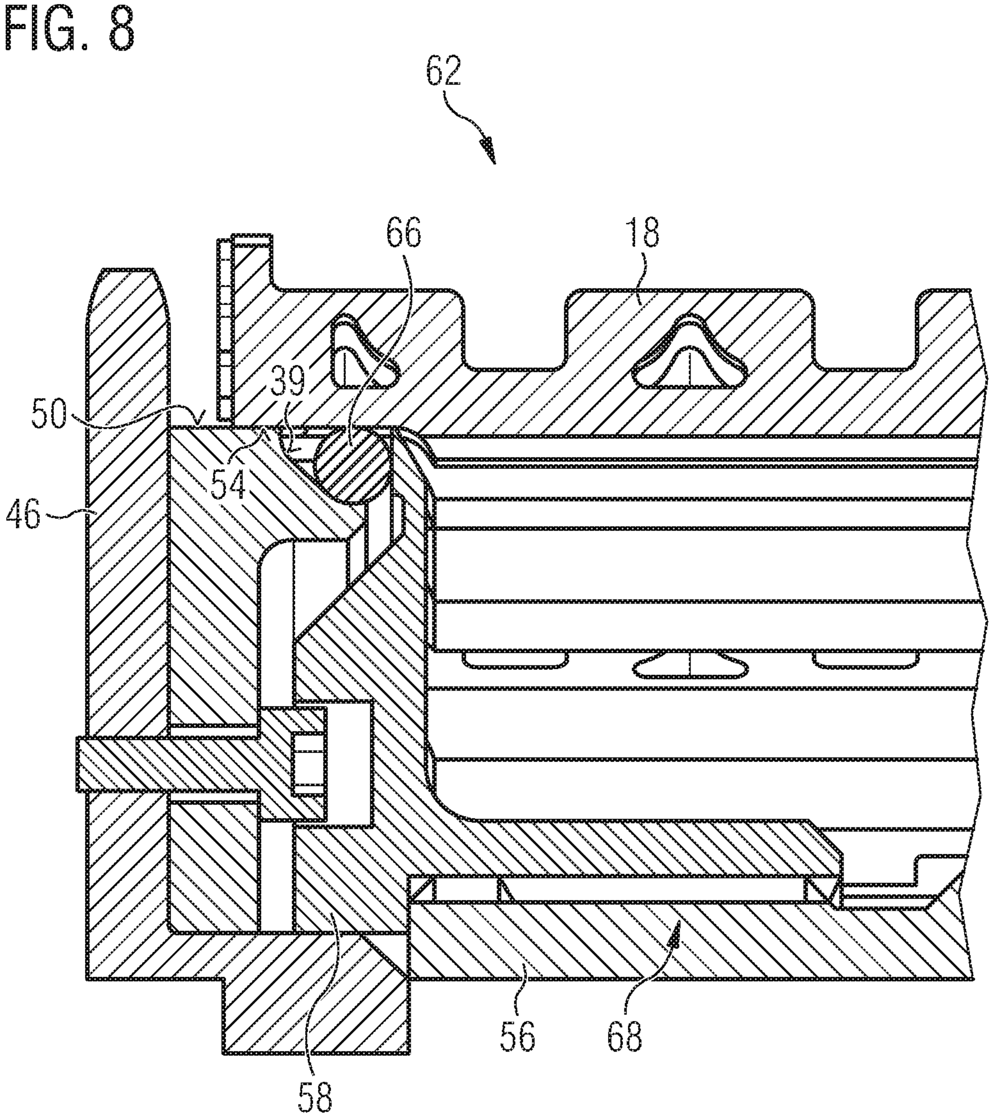
FIG. 8 shows an enlarged detail from FIG. 7.

For this purpose, the shaft 44 has a first bearing surface 50 and a second bearing surface 52 (see FIGS. 7 and 8). Each capsule carrier 18 has a contact surface 54 in a region of its first end 20 and in a region of its second end. The capsule carriers 18 are fixed or held in a form-fitting manner between the snap-fit connection 30 and the contact surfaces 54, or the bearing surfaces 50, 52, while the capsule carriers 18 are moved around the shaft 44.

FIG. 7 shows a sectional view of the shaft 44 according to FIG. 5 and FIG. 8 shows an enlarged detail from FIG. 7. The shaft 44 has a sleeve 56, a first flange 58 and a second flange 60. The first bearing surface 50 is adjacent to the first flange 58 and the second bearing surface 52 is adjacent to the second flange 60.

In the present case, the sleeve 56 is arranged coaxially with the shaft 44 and surrounds it radially outwardly. The two flanges 58, 60 are designed to be axially movable and are also arranged coaxially with the shaft 44.

In this case, the sleeve 56 is coupled to the shaft 44 in a rotationally fixed manner by means of a force-fit connection. In other words, the sleeve 56 rotates with the shaft 44 about the axis of rotation 37. Alternatively or additionally, the sleeve 56 can be coupled to the shaft 44 in a rotationally fixed manner by means of a form-fit connection by means of at least one coupling element (not shown).

In this case, the sleeve 56 can be rotated relative to the shaft 44 about the axis of rotation 37. This can be implemented, for example, by applying a force that overcomes the force-fit connection between the sleeve 56 and the shaft 44. If the sleeve 56 is connected to the shaft 44 by means of at least one coupling element, this connection must first be released so that the sleeve 56 can be rotated relative to the shaft 44.

The sleeve 56 is coupled to the two flanges 58 and 60 by means of a screw connection 68 in each case. For this purpose, the sleeve 56 has a left-hand thread in a region of its first end and a right-hand thread in a region of its second end, opposite the first end. Thus, a rotation of the sleeve 56 in a first direction of rotation causes an axial movement of the two flanges 58, 60 towards each other. A rotation of the sleeve 56 in a second direction of rotation, opposite to the first direction of rotation, causes the two flanges 58, 60 to move axially away from each other.

Figure 9:
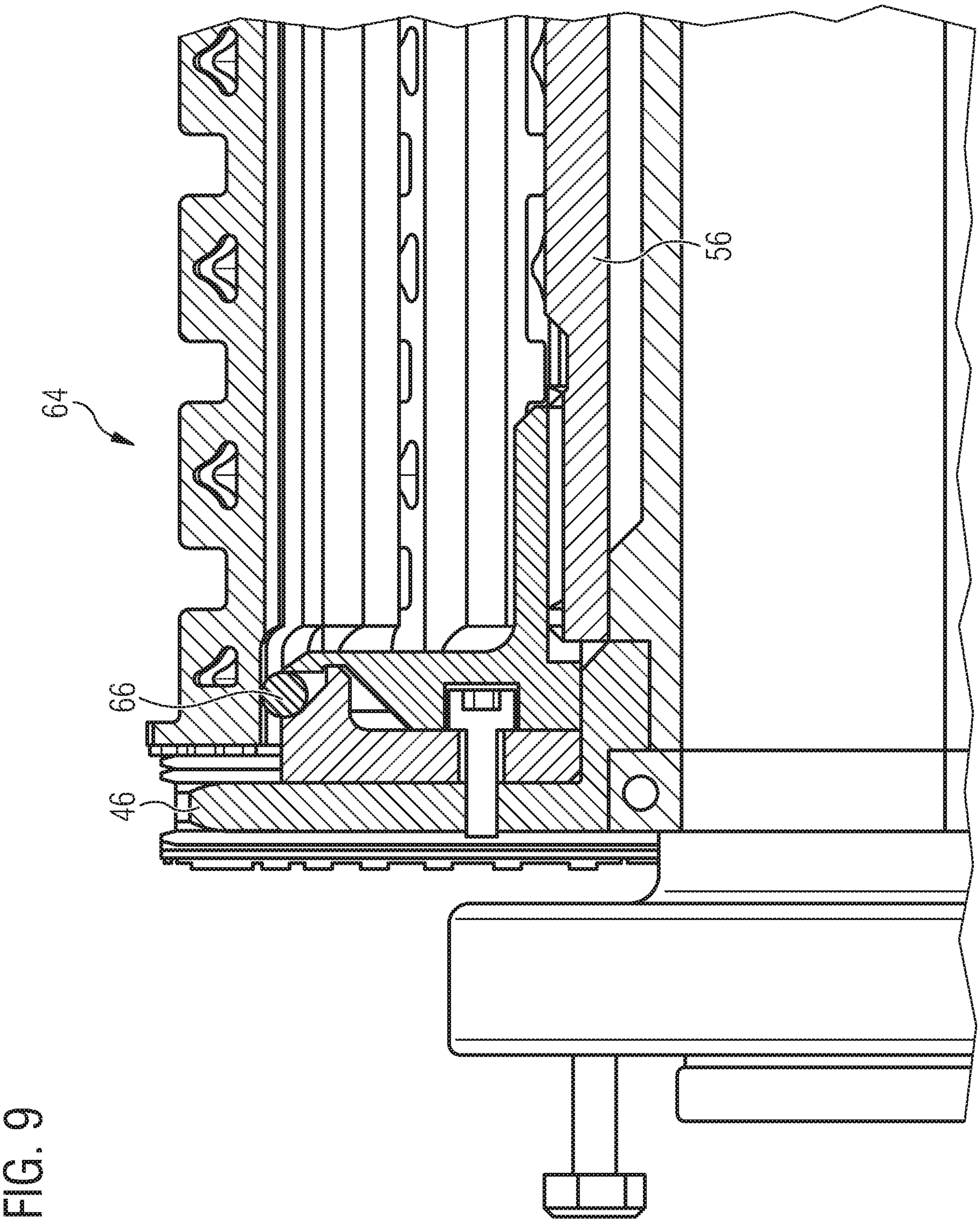
FIG. 9 is an enlarged detail of a sectional view of the shaft of FIG. 5 with the first flange and the second flange in a second position.

The two flanges 58, 60 can be moved axially between a first position 62 shown in FIG. 7 and a second position 64 shown in FIG. 9. In the first position 62, the two flanges 58, 60 are at a minimum distance from each other. In the second position 64, the two flanges 58, 60 are at a maximum distance from each other.

FIG. 9 shows an enlarged detail of a sectional view of the shaft 44 of FIG. 5, wherein the first flange 58 and the second flange 60 are arranged in the second position 64.

The shaft 44 comprises two flexible elements 66, here designed as O-rings. The flexible elements 66 are arranged coaxially with the shaft 44.

Moving the two flanges 58, 60 into the first position 62 (towards each other) causes the two flexible elements 66 not to protrude radially outward beyond the bearing surfaces 50, 52 of the shaft 44. In other words, the two bearing surfaces 50, 52 are aligned in the axial direction with the radial outside (or radial outer circumference) of the flexible elements 66. The two bearing surfaces 50, 52 of the shaft 44 and the radial outer diameter of the two flexible elements 66 are therefore equal. This allows the capsule carriers 18 to rest with their contact surfaces 54 on the two bearing surfaces 50, 52 (see FIGS. 5 to 8).

Moving the two flanges 58, 60 to the second position 64 (away from each other) causes the two flexible elements 66 to be moved radially outward. The radial outer side (radial outer circumference) of the flexible elements 66 projects radially outward beyond the bearing surfaces 50, 52 of the shaft 44. The radially outer diameter of the two flexible elements 66 is therefore larger than the diameter of the two bearing surfaces 50, 52 of the shaft 44. In the present case, the diameter of the flexible elements 66 designed as O-rings is increased by the movement of the two flanges 58, 60 into the second position 64.

Thus, the flexible elements 66 press the capsule carriers 18 radially outward and out of their snap-fit connection 30 while they are moved around the shaft 44, so that the snap-fit connection 30 is released or opened in each case. This releases the capsule carriers 18 from the two chains 26, 28.

In order to increase the diameter of the flexible elements 66 designed as O-rings, the shaft 44 has two pressure surfaces 39 oriented obliquely with respect to the axis of rotation 37 (see, for example, FIG. 8). When the two flanges 58, 60 move into the second position 64, they press on the flexible elements 66 and also move them axially away from each other. Due to the obliquely oriented pressure surfaces 39, the two flexible elements 66 are forced radially outwards into a radial movement. In other words, the diameter of the flexible elements 66 designed as O-rings is expanded (enlarged) at the obliquely oriented pressure surfaces 39. The axial and radial movement of the two flexible elements 66 are superimposed on each other.

If the two flanges 58, 60 are moved into the first position 62 (towards each other), the restoring force of the flexible elements 66 (due to the flexibility of the flexible elements) forces them radially inward. In other words, the flexible elements 66, designed as O-rings, contract again and thereby reduce their diameter. Due to the obliquely oriented pressure surfaces 39, the flexible elements 66 are forced to move axially towards each other. Here, too, the axial and radial movement of the two flexible elements 66 are superimposed on each other.

FIG. 10 shows a perspective view of the shaft 44 according to FIG. 5. The ejection device 42 has a chute 70. By means of the chute 70, both the capsules 12 and the capsule carriers 18 can be guided out of the apparatus 10. The capsules 12 or the capsule carriers 18 fall onto the chute 70 due to gravity and slide out of the apparatus 10 on the chute 70.

During operation of the apparatus 10, the two flanges 58, 60 are arranged in the first position 62 (see FIG. 7). To dismantle the capsule carriers 18, the two flanges 58, 60 are moved to the second position 64. This is implemented by rotating the sleeve 56 about the axis of rotation 37 relative to the shaft 44. When the two flanges 58, 60 are arranged in the second position 64, the flexible elements 66 designed as O-rings have an enlarged diameter. The two flexible elements 66 thus protrude radially outwards beyond the two bearing surfaces 50, 52. This increases the hub diameter of the shaft 44, as it were.

When the capsule carriers 18 are now moved about the shaft 44 by means of the two chains 26, 28, they are pressed by means of the two chains 26, 28 against the flexible elements 66 projecting radially outwards. In this case, a radially outwardly-directed force is exerted on the capsule carriers 18, so that the capsule carriers 18 are pressed out of the snap-fit connections 30 (due to this radially outwardly-acting force).

As soon as the snap-fit connections 30 are released or opened, the capsule carriers 18 can fall off the two chains 26, 28 due to gravity. The capsule carriers 18 then land in the chute 70, which is arranged below the shaft 44 in the direction of gravity 41.

What is claimed is:

1. An apparatus (10) for sealing and drying capsules (12) comprising:

a drying device (16) for drying capsules (12), wherein the drying device (16) comprises:

a plurality of capsule carriers (18), each capsule carrier (18) being elongated, having a first end (20), a second end (22), and a plurality of receptacles (24) for receiving capsules (12), a first chain (26) and a second chain (28) for receiving and transporting the capsule carriers (18), wherein the first end (20) of each capsule carrier (18) is coupled or couplable to the first chain (26) by a first snap-fit connection (30), wherein the second end (22) of each capsule carrier (18) is coupled or couplable to the second chain (28) by a second snap-fit connection (30), wherein the first and second snap-fit connections (30) are configured such that the capsule carriers (18) can be rotated about an axis of rotation (31) when the first and second snap-fit connections (30) are closed, wherein the drying device (16) comprises an ejection device (42), wherein the ejection device (42) is configured to remove capsules (12) from the receptacles (24) of the capsule carriers (18), and wherein the ejection device (42) is configured to release the first and second snap-fit connections (30) between the capsule carriers (18), the first chain (26), and the second chain (26).

2. The apparatus (10) according to claim 1, wherein the first chain (26) and the second chain (28) each have a plurality of extensions (32), wherein the first end (20) and the second end (22) of the capsule carrier (18) each have a clamp (34), wherein in each case an extension (32) and a clamp (34) form the first and second snap-fit connections (30).

3. The apparatus (10) according to claim 2, wherein each extension (32) has a stop (36), wherein the stop (36), when the first and second snap-fit connections (30) are closed, engages behind the corresponding clamp (34) of the corresponding capsule carrier (18), so that the capsule carriers (18) are fixed in a form-fitting manner between the first chain (26) and the second chain (28).

4. The apparatus (10) according to claim 2, wherein the plurality of extensions (32) are an elongate shape.

5. The apparatus (10) according to claim 1, wherein the drying device (16) comprises a plurality of gears (38), wherein the gears (38) mesh with chain links of the first chain (26) and/or the second chain (28).

6. The apparatus (10) according to claim 1, wherein the ejection device (42) comprises a shaft (44), wherein the shaft (44) has a first gear (46) and a second gear (48), wherein the first gear (46) and the second gear (48) are coupled to the shaft (44) in a rotationally fixed manner and mesh with chain links of the first chain (26) and the second chain (28), wherein the shaft (44) comprises a first bearing surface (50) and a second bearing surface (52), wherein each capsule carrier (18) has a contact surface (54) in a region of the first end (20) and in a region of the second end (22), wherein, when a capsule carrier (18) is moved around the shaft (44), the capsule carrier (18) contacts at least with a region of the contact surfaces (54): (i) at least one region of the first bearing surface (50), and (ii) at least one region of the second bearing surface (52).

7. The apparatus (10) according to claim 6, wherein the first bearing surface (50) adjoins the first gear (46), and wherein the second bearing surface (52) adjoins the second gear (48).

8. The apparatus (10) according to claim 6, wherein the shaft (44) comprises a sleeve (56), a first flange (58) and a second flange (60), wherein the sleeve (56), the first flange (58), the second flange (60) and the shaft (44) are arranged coaxially, wherein the sleeve (56) is arranged between the first flange (58) and the second flange (60), wherein the sleeve (56), the first flange (58), and the second flange (60) are coupled to one another such that a rotation of the sleeve (56) relative to the shaft (44) causes an axial movement of the first flange (58) and the second flange (60) between a first position (62), in which the first flange (58) and the second flange (60) are at a minimum distance from one another, and a second position (64) in which the first flange (58) and the second flange (60) are at a maximum distance from one another, wherein the shaft (44) comprises a plurality of flexible elements (66), wherein the flexible elements (66), the first flange (58), and the second flange (60) are configured and arranged in such a way that a movement of the first flange (58) and the second flange (60) into the first position (62) causes a radial movement of the flexible elements (66) radially inwards, and that a movement of the first flange (58) and the second flange (60) into the second position (64) causes a radial movement of the flexible elements (66) radially outwards, wherein the shaft (44) and the capsule carriers (18) are configured such that when the first flange (58) and the second flange (60) are arranged in the second position (64), the flexible elements (66) move the capsule carriers (18) radially outwards when the capsule carriers (18) are moved around the shaft (44), so that the first and second snap-fit connections (30) are released.

9. The apparatus (10) according to claim 8, wherein the first flange (58) is coupled to the sleeve (56) by a screw connection (68), and wherein the second flange (60) is coupled to the sleeve (56) by a screw connection (68).

10. The apparatus (10) according to claim 9, wherein the first flange (58) and the second flange (60) are each coupled pneumatically, hydraulically, and/or electrically to the sleeve (56).

11. The apparatus (10) according to claim 1, wherein the ejection device (42) comprises a deflector, wherein the deflector is configured such that the capsule carriers (18) can be detached from the first chain (26) and/or the second chain (28) by the deflector.

12. The apparatus (10) according to claim 1, wherein the ejection device (42) comprises at least one inflatable hollow ring, and/or at least one hub extension means, wherein the at least one inflatable hollow ring and/or the at least one hub extension means are configured to increase a hub diameter of the shaft (44).

13. The apparatus (10) according to claim 1, wherein the ejection device (42) comprises a chute (70), wherein the chute (70) is configured to guide the capsules (12) removed from the receptacles (24) of the capsule carriers (18) out of the apparatus (10), wherein the chute (70) is also configured to guide the capsule carriers (18) removed from the first chain (26) and the second chain (28) out of the apparatus (10).

14. A method for dismantling capsule carriers (18) of an apparatus (10) according to claim 1, the method comprising:

providing the apparatus (10), wherein the capsule carriers (18) are coupled to the first chain (26) and the second chain (28) by the first and second snap-fit connections (30), exerting a force on individual capsule carriers (18) to release the first and second snap-fit connections (30) in each case and to release the capsule carriers (18) from the first chain (26) and the second chain (28).

15. The method according to claim 14, wherein the method further comprises:

moving the capsule carriers (18) by the first chain (26) and the second chain (28) along a circular path or along a circular segment, and exerting a force directed radially outwards from a center point of the circular path or of the circular segment on the capsule carriers to open the first and second snap-fit connections (30) and release the capsule carriers (18) from the first chain (26) and the second chain (28).

16. The method according to claim 15, wherein the method further comprises:

fixing the capsule carriers (18) in such a way that rotation about the axis of rotation (31) due to gravity is prevented while the capsule carriers (18) are moved along the circular path or along the circular segment.

17. The method according to claim 14, wherein the method further comprises:

guiding the capsule carriers (18) released from the first chain (26) and the second chain (28) out of the apparatus (10).

18. The method according to claim 17, wherein the capsule carriers (18) released from the first chain (26) and the second chain (28) are guided out of the apparatus (10) by a chute (70).

* * * * *